Patented Dec. 11, 1928.

1,694,462

UNITED STATES PATENT OFFICE.

GELLERT ALLEMAN, OF SWARTHMORE, PENNSYLVANIA, ASSIGNOR TO SUN OIL COMPANY, OF PHILADELPHIA, PENNSYLVANIA, A CORPORATION OF NEW JERSEY.

MINERAL-OIL DERIVATIVES AND PROCESS OF MAKING SAME.

No Drawing.  Application filed March 26, 1927.  Serial No. 178,819.

The object of my invention is to produce, from crude petroleum, novel products substantially free from mineral oil and also more or less free from petroleum resins, adapted for many useful purposes. All of these products may be characterized as metallic derivatives, in that they are prepared by the addition of metallic salts to such fatty acid soaps so derived.

In order to produce these derivatives, it is first necessary to extract, from the crude petroleum, fatty acid soaps substantially free from mineral oil and also substantially free from, or with a very greatly reduced content of, resinous material. To do this I start, for example, with the alkali precipitate or soda sludge resulting from the treatment, with caustic soda or other alkali, of acid treated lubricating stock. The composition of this sludge, dependent on the preceding process, is quite variable. A typical composition comprises fatty acid soap, 11.6%; inert material similar to fossil resins, 17.1%; sodium sulfate, 2.3%; mineral lubricating oil, 46%; water, 23%.

It is known, as disclosed in the Maitland Patents No. 1,425,882 and No. 1,425,884, to treat the described herein precipitate or soda sludge so as to eliminate a large part of the water and most of the sodium sulfate and to reduce the percentage of mineral oil. Instead of starting my process with the untreated alkali precipitate, I may start the process with the product of the Maitland patents.

To any emulsion having a composition and characteristics similar to those described I add gasoline and also a small amount of lithium sulfate, sodium sulfate or potassium sulfate, or a small amount of lithium chloride, sodium chloride or potassium chloride. An immediate separation takes place of the gasoline and mineral oil, with most of the resins dissolved therein, from the soap, water and a minor proportion of the resins. The sulfates are found to be superior to the chlorides, the double negative charge on the sulfate ion being more effective than the single negative charge on the chloride ion in neutralizing and precipitating the positively charged emulsion particles. Lithium salts are superior to sodium salts, and sodium salts superior to those of potassium. This is a function of surface tension—lithium salts increasing the surface tension more than sodium or potassium salts, and hence tending to break the emulsion more rapidly. From a commercial standpoint, sodium chloride (common salt), because of its abundance and low cost, seems to be the most desirable substance to effect the separation of the gasoline and oil, with dissolved resins, from the soap, water and a minor proportion of resins. A saturated aqueous solution of the salt is used, being added to the amount of ten per cent of the total volume. The salt solution may be added before the introduction of the gasoline or it may be added after the gasoline has been distilled into the soap-oil-water emulsion. Instead of using a saturated solution of salt in water, solid sodium chloride (salt) may be added.

It is best to allow the gasoline to enter the crude soap tank, at the bottom, as a vapor. This stirs the mixture, and probably also aids in neutralizing the electrical charges on the suspended colloidal particles. Larger surfaces are exposed to the gasoline, in this manner. Less preferably, the gasoline may be added in liquid form.

The apparatus employed is conveniently arranged as follows: An upright, cylindrical container is employed to hold the oil-soap-water emulsion, which should fill the container to about one-third its capacity. This is conveniently connected to a gasoline still. The bottom of the first mentioned container should be above the level of the gasoline still. Vapors of gasoline are passed through appropriate pipes, from the still, to the bottom of the container holding the soap-oil-water emulsion. A saturated solution of common salt, equivalent in volume to about one-tenth of the soap-oil-gasoline emulsion is added. Gasoline vapor is introduced at the bottom until the container is almost filled by the condensed gasoline. The introduction of gasoline into this container is then discontinued and the mixture allowed to separate. The gasoline-oil layer on top is siphoned back into the gasoline still and the process repeated. After about three extractions, the soap-water solution which remains in the bottom of the container is substantially free of mineral oil, but contains such petroleum resins as may not have been dissolved by the gasoline. The gasoline may be added as a liquid, but is is much preferred to introduce it as a vapor. In place of gasoline, I may use any light hydrocarbon, whether derived from petroleum or other sources, such as a benzol distillate from coal tar.

The purified soap contains the original sulfur compounds, wholly or principally sodium sulfate, which were in the crude soap. It is not necessary, for all purposes, to remove these salts, but for other purposes their removal may be desirable or even necessary. They may be removed by different known methods. For example, the soap solution may be concentrated by first evaporating some of the water (to expedite the operation) and then cooling in order to separate the soap from the sodium sulfate, which remains in solution in the water. The separation begins to take place at about 5° C. and is hastened by lower temperatures. The sodium sulfate remains in solution in the water.

The soap may be converted into fatty acids, in any known manner, as, for example, by decomposing the soap with sulfuric, hydrochloric or other mineral acids. These fatty acids have an acid number of about 103.5. (The original crude soap before treatment yields fatty acids having an acid number of 30.)

The fatty acids are now subjected to distillation at an absolute pressure of 4 mm., yielding distillates which are free from resins. Up to a temperature of 180° C. a fraction is obtained having an acid number of 187.06. The next fraction boiling off between 180° and 190° C. has an acid number of 174.4. The next fraction boiling off between 190° and 200° C. has an acid number of 160. The residue, containing most of the resins present before distillation, has an acid number of 61. The distillates contain very little of the resins, the lower boiling distillate being almost or quite free from resins.

The described process is set forth in an application filed by me July 18, 1925, Serial No. 44,629.

In carrying out my complete process, I may utilize the soap produced before distillation, which soap is free of mineral oil and contains a substantially reduced percentage of resins and, if converted into fatty acids by decomposition, has an acid number of (say) 103.5; or I may saponify any of the fatty acid distillates, or any mixture of the fatty acid distillates, having acid numbers varying from (say) 160 to 187 or over, produced in the last step of the described process, by any known means of saponifying fatty acids and use the soap thereby produced, which soap is also free of mineral oil and contains a still smaller percentage of the original resins or substantially none of the original resins.

To this composition I have added certain water-soluble metallic salts (of calcium, barium, zinc, lead, manganese, copper, chromium, cobalt, nickel and magnesium) and have prepared therefrom metallic derivatives having certain characteristics in common which make them adaptable for the manufacture of the same or similar useful products. Each of these metallic derivatives has also characteristics peculiar to itself which make it particularly adaptable to the manufacture of certain products.

With the exception of the magnesium derivative, all of the metallic derivatives are almost or quite insoluble in water. They may be said, therefore, to be substantially insoluble in water.

In preparing the calcium derivative I proceed as follows:

1 kg. of anhydrous soap, substantially free from mineral oil, and from which have been eliminated more or less of the resins, as above described, is dissolved in water. Assuming (for purposes of calculation) that the anhydrous oil-free soap has an acid value of approximately 160, it will require approximately 160 grams of anhydrous calcium chloride to precipitate the sodium in the anhydrous oil-free soap and produce a corresponding calcium derivative. It will be readily understood that in case the acid value of the anhydrous oil-free soap is lower or higher, a correspondingly less or greater amount of calcium chloride will be required. The anhydrous calcium chloride is dissolved in about 500 cc. of water. While stirring the soap solution, the solution of calcium chloride is added gradually. The calcium derivative of the soap separates out as a light colored, extremely sticky, tenacious mass. In consistency, it suggests taffy. The sticky mass, which flows at a temperature of about 60° F., is next washed with cold water, during which process it is agitated by means of a mechanical stirrer or by means of air. The mechanical stirrer seems to be more desirable for this purpose, as fine fibers of the calcium derivative are pulled through the water, thus gaining greater surface for washing. After washing with water, it may be partly dried by the application of heat.

While the calcium derivative is insoluble in water, it is very soluble or miscible in ethyl acetate, carbon tetrachloride, gasoline, benzene and ether. It is slightly soluble or miscible in linseed oil and turpentine, and is difficultly soluble in ethyl alcohol, methyl alcohol, and acetone.

Unless heated, the calcium derivative will not dry on long exposure to the air, but remains sticky. When mixed with calcium carbonate, it forms a non-drying, non-hardening, putty-like mass which sticks to glass, wood or iron with great tenacity. This tenacity is much greater than in the case of ordinary putty. Since this non-drying putty-like substance will stick to glass and iron, and accommodates itself without cracking to the differences in volume due to the contraction by cold and the expansion by heat of iron window sashes, this mixture will not break the glass as does ordinary putty.

Among other uses to which the calcium derivative is applicable may be mentioned:

As a non-drying adhesive for insulating electric tape.

For application to fly paper.

Waterproofing cement foundations or walls by dissolving it in gasoline, applying it to the cement or walls, and allowing the gasoline to evaporate, or by placing it directly on paper, which it impregnates, placing this impregnated paper on the cement wall and affixing the paper to the cement wall by the addition of a layer of cement on the outside of the impregnated paper.

As waterproofing material for tents, boats, etc.

As a wood filler when dissolved in an appropriate solvent.

As a colorless varnish when dissolved in linseed oil or other solvents. A drying agent must be added for this purpose.

As a powerful adhesive for glass plates, flexible magazine backs and leather, and for placing linoleum on wooden or cement floors.

As a tree girdle for protection against climbing insects.

As an elastic grafting wax.

As hard enamel on the surface of iron and other metals, by dissolving in a suitable solvent, placing on clean metal, and baking at a temperature at which it will decompose.

The barium derivative may be prepared in a similar manner to that employed in making the calcium derivative, by employing barium chloride, or any other water soluble salt of barium.

All of the amounts of metallic salts specified hereinafter are based on the assumption that the anhydrous oil-free soap has an acid value of approximately 160. It will be readily understood that in case the acid value of the anhydrous oil-free soap is lower or higher, a correspondingly less or greater amount of the water-soluble metallic salt will be required.

In all cases I use the term "approximately" because the water-soluble metallic salt to be used will probably not be one hundred per cent.

It requires approximately 351 g. of $BaCl_2,2H_2O$ to treat 1 kg. of the soap. The barium derivative is slightly darker in color than the calcium derivative, and is similar in physical properties to it. It is, however, more soluble in turpentine than is the calcium derivative. It possesses no marked advantage over the calcium derivative, and is more expensive. It is propably superior to the calcium derivative when employed in connection with the manufacture of color lakes, as hereinafter described.

The zinc derivatives may be made from the soap by treating 1 kg. of the oil-free soap with approximately 414 gm. of $ZnO_4,7H_2O$. It possesses many of the physical properties of the calcium and barium derivatives, but is differentiated by the fact that it is very soluble in acetone. It is darker in color than either the calcium derivative or the barium derivative, and is extremely adhesive. It can be used for surgical dressings, in which case it may be spread on cloth. It can also be used as a substitute for antiphlogistine or other ointments of a similar nature. When mixed with toluene dichloramine, it possesses very decided antiseptic properties. It can also be used as a substitute for pigments in ordinary paints.

The lead derivative is made by adding approximately 476 gm. of $Pb(NO_3)_2$ (dissolved in water) to 1 kg. of the soap. Its color is about the same as the color of the calcium derivative, and its solubility is similar. It posseses great adhesive properties, and may be used as a surgical dressing. It can also be used as a substitute for the pigments employed in lead paints. It possesses one marked difference from the other derivatives, in that it hardens on standing in air. It may also be employed as an anti-knock material in gasoline.

The manganese derivative is prepared by adding approximately 321 gm. of $$MnSO_4,4H_2O$$

to 1 kg. of the soap. It is of a mahogany color, and hardens on exposure to air.

The copper derivative is made by adding approximately 359 gm. of $CuSO_4,5H_2O$ to 1 kg. of the soap. When dry, this is a very dark green, but in thin layers its color resembles that of the mineral malachite. It can be used as a paint.

The chromium derivative is made by adding approximately 383 gm. of $$Cr(NO_3)_3,9H_2O$$

to 1 kg. of the soap. When dry, its color is similar to that of chrome green, and may be substituted for chrome green in the manufacture of paints.

The cobalt derivative is made by adding approximately 418 gm. of $Co(NO_3)_2,6H_2O$ to 1 kg. of the soap. It is purple in color when dry, and can be employed in the manufacture of paints.

The nickel derivative is made by adding approximately 404 gm. of $NiSO_4,7H_4O$ to 1 kg. of the soap. In thin layers it is apple green. It can be employed as a pigment in the manufacture of paint.

Certain of these metallic derivatives are particularly adaptable to the manufacture of color lakes. Thus, red, blue, and yellow color lakes are made by dissolving the appropriate dyestuff in water, adding it to the soap, and then adding the required amount of calcium or barium salt to exactly precipitate the lake. These calcium and barium lakes are soluble in practically the same solvents as the calcium and barium derivatives. The lakes can be employed in the manufacture of varnishes, colored paints, lithographic and colored printing inks, and wall paper inks. Salts other than those of barium and calcium may be used to precipitate the color lakes, but the color indicated for calcium and barium may not be the same color when other salts are used in precipitating the lakes. Salts of barium and calcium give better colors and give more desirable physical properties to the color lakes than when other salts are used. In dyeing cloth by means of fluorescein, an aluminum salt gives a red color and a tin salt a blue color.

I have not herein specified all the metallic derivatives which may be prepared from the described fatty acids. It will be understood that various water-soluble salts of each metal may be substituted for the salts specified. It would be impossible to make an exhaustive statement of the useful purposes for which these metallic derivatives may be used, but the uses specified are suggestive of the wide range of utility possessed by these derivatives.

I do not herein claim the described process of manufacturing color lakes from petroleum, the same forming the subject-matter of a separate application.

While, in my preferred process, I prefer to eliminate the mineral oil and, in whole or in large part, the petroleum resins, by means of the process herein described, I have claimed that process per se in a separate application filed July 18, 1925, Serial No. 44,629, and do not herein limit my invention to that process, except in the claim or claims wherein it is specifically recited. The separation of the soap from the oil and resins is merely the first step of my complete process and may be effected in any way, now known or hereafter discovered, preparatory to carrying out those steps of my complete process whereby my new products are produced.

Where, in the claims, I refer to materially reducing the content of resins, I mean to include the reduction of the resin content to any degree, including its substantial elimination, where such elimination can be effected by the distillation described, or otherwise.

Having now fully described my invention, what I claim and desire to protect by Letters Patent is:

1. The process of manufacturing metallic derivatives from petroleum which comprises separating, from an emulsion of soap, petroleum resins and mineral oil, a water-soluble soap substantially free from mineral oil and containing a materially reduced amount of petroleum resins, adding thereto a water-soluble metal salt in amount sufficient to exchange the metallic ion of the added salt for the metallic ion of the water-soluble soap, the added metallic ion forming a water-insoluble soap with the acid radical, and separating out the metallic derivative.

2. The process of manufacturing metallic derivatives from petroleum which comprises treating petroleum with an acid and an alkali and separating out an impure soap containing mineral oil and resinous material, separating from the soap substantially all of the mineral oil and a substantial proportion of the petroleum resins and thereby obtaining a water-soluble soap, adding to the water-soluble soap a water-soluble metal salt in amount sufficient to exchange the metallic ion of the added salt for the metallic ion of the water-soluble soap, the added metallic ion forming a water-insoluble soap with the acid radical, and separating out the metallic derivative.

3. The process of manufacturing metallic derivatives from petroleum which comprises separating, from an emulsion of soap, petroleum resins and mineral oil, a water-soluble soap substantially free from mineral oil and containing a materially reduced amount of petroleum resins, dissolving the soap in water, dissolving a water-soluble metal salt in water, adding the metal salt solution to the soap solution in amount sufficient to exchange the metallic ion of the added salt for the metallic ion of the water-soluble soap, the added metallic ion forming a water-insoluble soap with the acid radical, and separating out the metallic derivative.

4. The process of manufacturing metallic derivatives from the precipitate resulting from the treatment with an alkali of an acid-treated mineral oil lubricating stock, said precipitate containing a water-soluble fatty acid soap, mineral oil and resinous material, which comprises substantially eliminating the mineral oil and substantially reducing the resin content, adding to the remaining water-soluble soap a solution of a metal salt to effect an exchange of the metallic ion of the added salt for the metallic ion of the water-soluble soap, the added metallic ion forming a water-insoluble soap with the acid radical, and separating out the metallic derivative.

5. The process of manufacturing metallic derivatives from a water-soluble fatty acid soap and resinous material containing mineral oil emulsified therewith, which comprises adding thereto gasoline, which dissolves the oil and some of the resins, separating out the gasoline-oil-resin solution, adding to the water-soluble soap substantially free from mineral oil and with a substantially reduced resin content, a water-soluble metal salt in amount sufficient to exchange the metallic ion of the added salt for the metallic ion of the water-soluble soap, the added metallic ion forming a water-insoluble soap with the acid radical, and separating out the metallic derivative.

6. The process of manufacturing metallic derivatives from a water-soluble fatty acid soap and resinous material containing mineral oil emulsified therewith, which comprises adding thereto a water-soluble de-emulsifiable salt and gasoline, the gasoline dissolving the oil, separating the gasoline solution from the soap, converting the soap into fatty acids, separating the fatty acids from resins that have not been dissolved by the gasoline, saponifying the fatty acids to produce a water-soluble soap substantially free from gasoline and containing relatively little resinous materials, adding to the water-soluble soap a water-soluble metal salt in amount sufficient to exchange the metallic ion of the added salt for the metallic ion of the water soluble soap, the added metallic ion forming a water-insoluble soap with acid radical, and separating out the metallic derivative.

7. The process of manufacturing metallic derivatives from petroleum which comprises separating, from an emulsion of soap, petroleum resins and mineral oil, a water-soluble soap substantially free from mineral oil and containing a materially reduced amount of petroleum resins and which if decomposed to fatty acids will have an acid number not less than about 100, adding thereto a water-soluble metal salt in amount sufficient to exchange the metallic ion of the added salt for the metallic ion of the water-soluble soap, the added metallic ion forming a water-insoluble soap with the acid radical, and separating out the metallic derivative.

8. The process of manufacturing metallic derivatives from petroleum which comprises separating, from an emulsion of soap, petroleum resins and mineral oil, substantially all of the mineral oil and so large a proportion of the resins that the soap if decomposed to fatty acids will have an acid number not substantially less than 160, adding thereto a water-soluble metal salt in amount sufficient to exchange the metallic ion of the added salt for the metallic ion of the water-soluble soap, the added metallic ion forming a water-insoluble soap with the acid radical, and separating out the metallic derivative.

In testimony of which invention, I have hereunto set my hand, at Swarthmore, Pennsylvania, on this 18th day of March, 1927.

GELLERT ALLEMAN.